United States Patent [19]
Kersten et al.

[11] Patent Number: 5,798,503
[45] Date of Patent: Aug. 25, 1998

[54] METHOD OF ACHIEVING A COMFORTABLE TEMPERATURE IN A ROOM, AND DEVICE FOR CARRYING OUT THIS METHOD

[75] Inventors: Reinhard Kersten; Klaus Klinkenberg, both of Aachen, Germany

[73] Assignee: U.S. Philips Corporation, Tarrytown, N.Y.

[21] Appl. No.: 785,458

[22] Filed: Jan. 17, 1997

[30] Foreign Application Priority Data

Jan. 20, 1996 [DE] Germany .................. 196 02 085.9

[51] Int. Cl.$^6$ ........................................ H05B 1/02
[52] U.S. Cl. .................. 219/497; 219/494; 219/518; 307/117
[58] Field of Search .................. 219/494, 505, 219/497, 499, 501, 506, 518; 307/117, 119

[56] References Cited

FOREIGN PATENT DOCUMENTS

WO 9416370   7/1994   WIPO .

*Primary Examiner*—Mark H. Paschall
*Attorney, Agent, or Firm*—Ernestine C. Bartlett; Norman N. Spain

[57] ABSTRACT

A method of achieving a comfortable temperature in the surroundings of a person, who is present in a room of low temperature, by means of a radiator is quickly reached and continuously maintained by continuously measuring the temperature in the surroundings of the radiator (18). While a direct thermal influence of the radiator is avoided, or the measurement is avoided, a required irradiation for the person is calculated from the temperature data by an electronic unit. The distance between the person and the radiator is measured, and the required power is provided to the radiator (18) in accordance with the calculated irradiation and the measured distance.

10 Claims, 2 Drawing Sheets

METHOD OF ACHIEVING A COMFORTABLE TEMPERATURE IN A ROOM, AND DEVICE FOR CARRYING OUT THIS METHOD

BACKGROUND OF THE INVENTION

The invention relates to a method of achieving a comfortable temperature in the surroundings of a person, who is present in a room of low temperature, by means of a radiator.

It may be economical in the case of rooms which are not in continuous use to heat these rooms only when they are required. It is a condition for this, however, that thermal comfort, i.e. a comfortable temperature is available for the user of such a room after a short period already, for example within 10 minutes. This can still be considerably less expensive if the additional heating is operated, for example, electrically, compared with a continuous heating with gas, in spite of higher energy prices for electrical power.

Electric fan heaters and electrically operated oil radiators are mainly used for these applications nowadays, but these do not meet the requirements mentioned above:

Fan heaters draw cold air from the floor region and heat it to approximately 90° C. This hot air cools down quickly in that it carries along and mixes itself with cold air from the room and leads to draft effects owing to the forced air movement. In addition, a considerable temperature layer effect is observed over the height of the room, which may easily amount to 10° C. and leads to uncomfortable conditions (hot head and cold feet). Thermal comfort is not achieved with the use of such convection heaters until either the air temperature is so high that the radiation effect of the cold wall surfaces is compensated for or the wall temperatures have been sufficiently raised. Periods of approximately one hour must be counted with for reaching comfortable conditions starting from approximately 16° C. in the case of rooms in conventional buildings. Further considerable disadvantages of fan heaters are noise, blowing up of dust, smells owing to singeing of dust particles on the heater coils, and drying-out of eyes and mucous membranes by the air flow. Oil radiators have a comparatively large heat capacity, but they require approximately ten minutes for reaching their operational temperatures and supplying their full power to the room. The heat is given off in the form of radiation for no more than approximately 60% and is not efficiently aimed and fairly diffuse owing to the constructional shape. Thus no fast improvement in the comfort of the user of the room can be achieved either. In addition, the fill stored heat capacity cannot be usefully employed anymore after the user has left the room. Oil radiators are also quite big and comparatively heavy.

Another possibility of supplying additional heat energy is found in the use of an electric radiator, for example constructed as a conventional bathroom radiator (quartz tube radiator). However, the low quartz tube temperature of approximately 1000° leads to a comparatively low power density of approximately 14 W/cm length. This means that a power requirement of approximately 1.5 to 2 kW will lead to somewhat too large dimensions and thus to bad focusing possibilities on a given field or body to be irradiated. Such radiators are indeed suitable for providing comfortable conditions for the user of the room within a very short period by means of a well-defined additional radiation, also at low ambient and air temperatures. The radiation, however, should be so confined during this that thermal comfort, i.e. a comfortable temperature, is maintained also when the ambient temperatures change during the course of the utilization period.

A method of the kid mentioned in the opening paragraph and a corresponding device in which an electric heat radiator is used are known, for example from WO 94/16370. It is the object of the known construction to use heat energy in an economical manner for business locations in which persons are present for only part of the time. To achieve this, said rooms are initially heated by conventional heating means up to a temperature which lies below the comfortable temperature. The moment a person enters the room, additional heat is provided by means of the radiator which is mounted to the ceiling of the room and which can be heated, for example, electrically or with gas. A sensor which monitors the functions of the radiator in relation to the presence of a person in the room is arranged, for example, fixedly in the radiator.

SUMMARY OF THE INVENTION

The invention has for its object to improve the method mentioned in the opening paragraph by simple means such that the user of a room of low temperature will experience with certainty thermal comfort within a very short time, for example within ten minutes, which comfort can also be maintained by a suitable control mechanism when the ambient conditions change.

This object is achieved in a method of the kind mentioned in the opening paragraph in that a) the temperature in the surroundings of the radiator is continuously measured, while a direct thermal influence of the radiator on said measurement is avoided, b) a required irradiation for the person is calculated from the temperature data by an electric unit, c) the distance between the person and the radiator is measured, and d) the required power is provided to the radiator (1) in accordance with the calculated irradiation and the measured distance.

Such a method is based on the recognition that the human body maintains a continuous heat exchange with its surroundings. First of all, the thermal comfort, i.e. the comfortable temperate desired at any moment, is influenced here by the average temperature of the wails bounding the room (radiation) and by the air temperature in the surroundings of the person (convection). The air velocity and the relative humidity are also relevant, although the latter quantity is of lesser importance. If the ambient conditions desired for comfort lie within certain limits, the human body will perceive them as being comfortable. It is the object to offer the user of the room thermal comfort quickly and durably in spite of a low radiation temperature of the surrounding wall surfaces and a too low air temperature in the room, for which purpose, according to the invention, the ambient parameters adversely affecting the thermal comfort are quickly compensated for by the additional radiation source. The concept is based on the recognition that the parameters adversely affect the thermal comfort can best be measured in the surroundings of the additional radiation source, provided the radiation source itself does not directly influence the measurement. A control and an adaptation to various conditions takes place through a continuous measurement in this location.

In an embodiment of the invention, the temperature measurement covers both the air temperature caused by convection and the radiation temperature of the wall surfaces bounding the room. So the radiation and air temperatures are continuously measured as the ambient parameters so that the necessary radiation compensation can be deduced therefrom. The power of the radiator required in each case can be simply adapted when it is further known how the irradiance of the radiator necessary for achieving a desired comfortable temperature depends on the distance to the person (appliance data which depend on the radiation distribution and connected power load). According to a further characteristiic of the invention, said distance may either be se manually and fed to the electronic unit as a constant quantity or be automatically and continually measured by a sensor.

The invention further relates to a device for carrying out the method according to the invention as described above, which device is characterized by

- at least one radiator arranged in the room and aimed at the person,
- a measuring unit for measuring the temperature arranged in the surroundings of the radiator and not directly thermally influenced thereby, and
- an electronic unit for evaluating the temperature measurement data and for controlling the power supplied to the radiator.

It is only necessary in such a constriction, therefore, to supply the electronic unit with the distance between the person and the radiator in addition to the temperature measurement mentioned. In an embodiment of the invention, for example, this may be done by means of a keyboard or a rotary control if the distance is determined or set by hand. A greater distance value put in implies a higher radiation power, a smaller distance a smaller radiation power. A simple individual adaptation to higher or lower comfort requirements can thus also be achieved through a greater or smaller distance setting.

In an alternative embodiment of the invention, a measuring unit for measuring the distance between the person and the radiator is positioned in the region of the radiator. The distance between the person and the radiator is automatically measured thereby and supplied to the electronic unit. In a further embodiment of the invention, the measuring unit may be an ultrasonic measuring unit or an infrared measuring unit.

A further embodiment of the invention is characterized in that the radiator is movably arranged and can be aimed at the person and made to follow the person via a movement detector. This embodiment of the invention thus also renders it possible to achieve a desired comfortable temperature in various locations of the room.

In a runner embodiment of the invention:

- the irradiance of the person required for achieving a desired comfortable temperature and dependent on the ambient temperature of the radiator is stored in the electronic unit in the form of a first table, and
- the required radiation power dependent on the irradiance and on the distance between the radiator and the person is stored in the electronic unit in a second table.

BRIEF DESCRIPTION OF THE DRAWING

In the drawing, FIGS. 1 to 3 diagrammatically show embodiments of the subject of the invention.

DETAILED DESCRIPTION OF THE INVENTION

Figure 1:
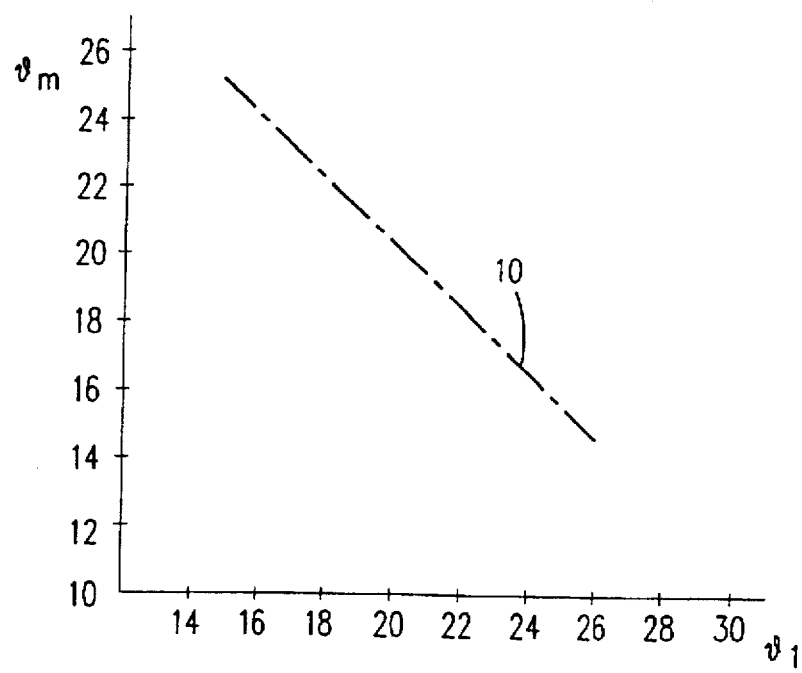
FIG. 1 is a diagram representing a known comfort line.

The invention will now be described in greater detail with reference to the figures of the drawing.

In the known diagram of FIG. 1, the average surrounding wall surface temperature $\theta_m$ is plotted against the room air temperature $\theta_l$. The dash-dot line 10 shows the optimum comfort line according to Fanger, see "Mensch und Raumklima" by P. O. Fanger, in "Raumklimatechnik" , vol. 1, published by Springer Verlag, 1994. This teaches, for example, that a same comfort is experienced when the room air temperature rises and at the same time the average surrounding wall surface temperature drops.

Figure 2:
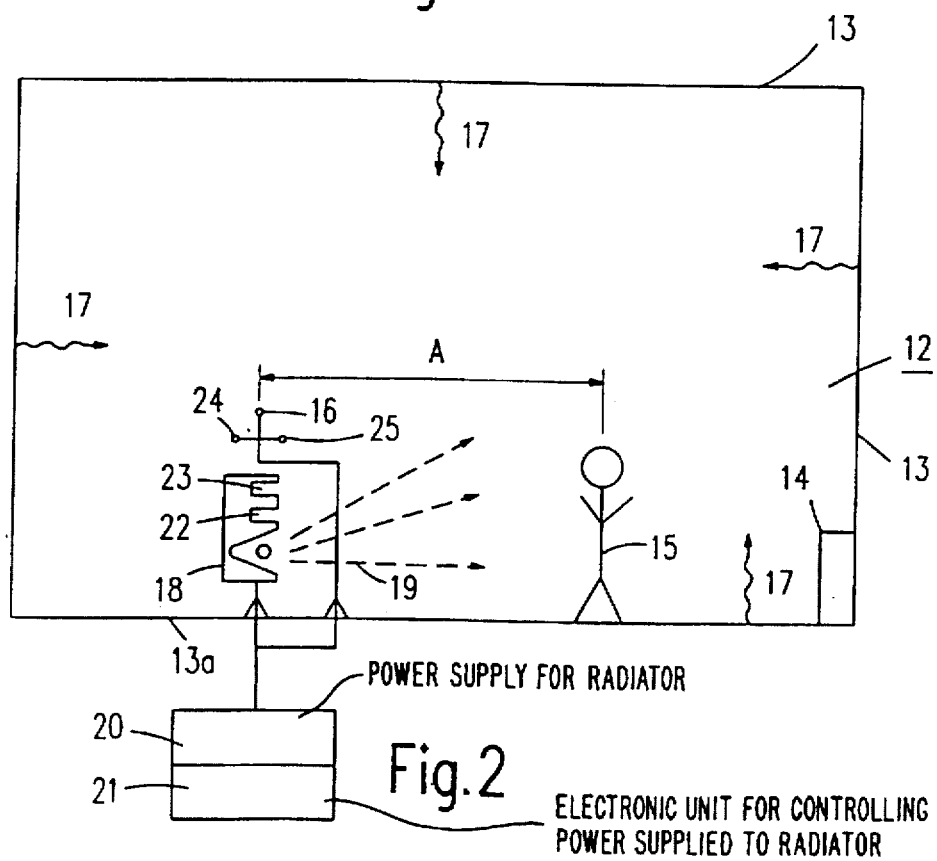
FIG. 2 diagrammatically shows a room with a person and an additional heat radiation body.
Figure 3A:
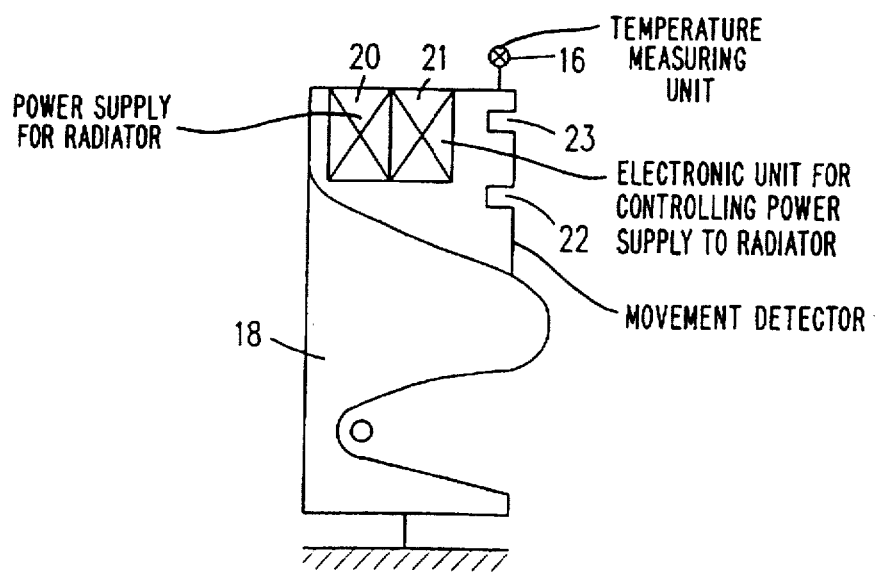
FIGS. 3a to 3c show heat radiation bodies with various integrated sensors.
Figure 3B:
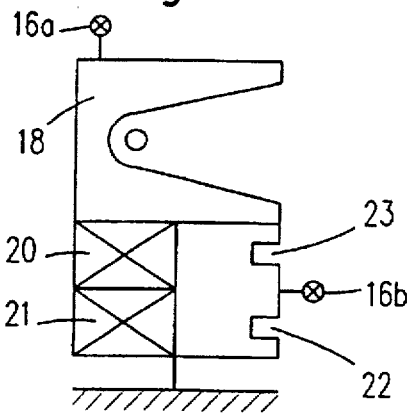
Figure 3C:
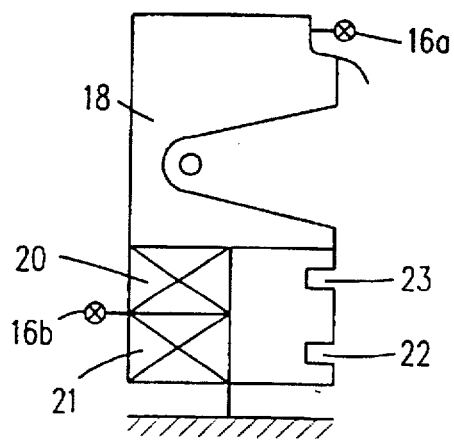

FIG. 2 shows a room 12 which is bounded on ail sides by surfaces 13. A heating body 14 provides a basic heat inside the room 12, however, this heat is insufficient for achieving a comfortable temperature for a person 15 preset in the room. Adjacent the person 15 (typically at a distance of 1 to 3 m) there is a temperature measuring unit 16 which is to measure the temperature in this location. The temperature measuring unit 16 is influenced on the one hand by the average temperature of the surrounding surfaces 13 of the room 12 and of the heating body 14 (radiation) and on the other hand by the air temperature in this location generated by air convection, for example originating from flows induced by the heating body 14. To achieve a given improvement of the thermal comfort in the region of the person 15, according to the invention, a heating radiator 18 is provided on the floor 13a of the room 12, the radiation 19 of which is aimed at the person 15. The heating radiator 18 is preferably positioned in the vicinity of the temperature measuring unit 16 such that the temperature measuring unit 16 is not in the field of radiation of the heating radiator 18. Reference numeral 20 denotes a power supply unit for the radiator 18. 21 denotes an electronic unit, for example comprising a microprocessor, which is connected at one side to the measuring unit 16 and at the other side to the power supply unit 20. The distance between the radiator 18 and the person 15 is denoted with A and is measured by a measuring unit 22 in the radiator 18. A movement detector 23 is provided with adjustment possibility and is connected to the electronic unit 21, as is the unit 22. The moment the person 15 enters the room 12 and reaches the range of the movement detector 21, a temperature measurement is carried out by the measuring unit 16 and, if the temperature is too low, the heating radiator 18 will be automatically switched on. The distance A may here be put in by hand as a fixed value or may be automatically determined by the measuring unit 22. The electronic unit 21 compares the received data with stored reference data and switches off the power for the power source 20 the moment the desired comfortable temperature in the surroundings of the person 15 has been achieved. If so desired, the heating radiator 18 may be constructed so as to be movable and capable of following the person 15 in that the movement detector 23 determines the position of the person 15 at any moment and passes it on to the electronic unit FIGS. 3a, b, and c show preferred embodiments in which the heating radiator 18, the power supply unit 20, the electronic unit 21, and the measuring unit 16 are combined into a single appliance. It is ensured in all cases here that the sensor 16 is not directly influenced by the heating radiator 18 but nevertheless registers the temperature conditions of the surroundings (radiation and air temperature) substantially without being disturbed. In FIG. 3a, accordingly, the temperature sensor 16 is provided on the radiator housing with good heat insulation such that any hot air from the radiator passes along in front of the temperature sensor 16 without influencing it. It is obvious that the temperature sensor 16 in FIG. 3a does not effectively register the heat radiation from the floor region behind the heat radiator. FIGS. 3b and 3c show devices with two temperature sensors 16a and room. The measured temperature value the is, for example, the arithmetic mean of the values measured by the temperature sensors 16a and 16b.

The steps for achieving a given improvement in the thermal comfort in the room 12 will be shown below in the form of two flowcharts. The adjustment of the distance A between the person 15 and the radiator 18 is carried out by band in the first flowchart, whereas a fully automatic measurement of this distance A takes place in the second flowchart.

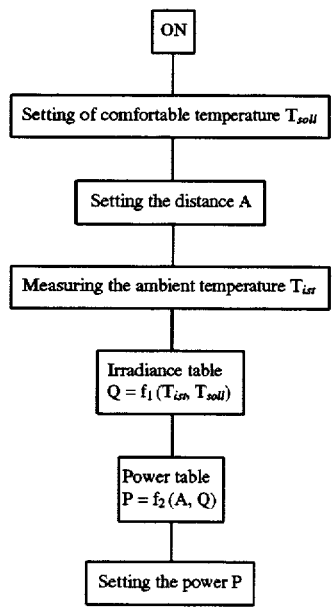

After the electronic unit 21 has been switched on, the desired comfortable temperature $T_{soll}$ is first set. Then the distance A between the person 15 and the radiator 18 is adjusted. The electronic unit 21 subsequently measures the actual temperature $T_{ist}$ in the surroundings of the measuring unit 16 and compares it with the desired comfortable temperature. The electronic unit 21 determines the required power $P_{Tsoll}$, which is dependent on the distance A and the measured actual temperature $T_{ist}$. Finally, the power supply unit 20 provides the radiator 18 with the required power.

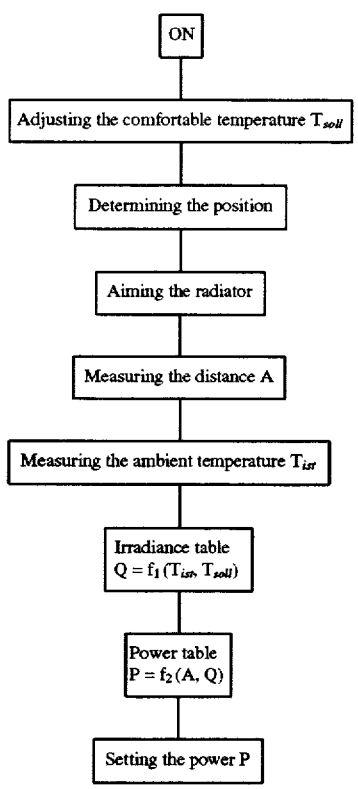

In contrast to the first flowchart, it is the movement detector 23 here which determines the position of the person 15, aims the radiator 18 accordingly, and measures the distance A. The rest of the process is carried out as explained with reference to the first flowchart.

A first table is shown below by way of example representing the interrelationship between the ambient temperature $T_{ist}$, the desired comfortable temperature $T_{soll}$, and the irradiance Q resulting therefrom in accordance with the function:

$$Q = f_1(T_{ist}, T_{soll}).$$

A second table shows by way of example the radiator power P required for a radiator 18 in dependence on the Q and the distance A between the radiator 18 and the person 15 in accordance with the function:

$$P = f_2(A, Q).$$

Example of a table for the irradiance in accordance with the first and second flowchart.

$Q = f_1(T_{ist}, T_{soll})$ (unit W/m$^2$)

TABLE 1

| | $T_{soll}$/°C. | | | | | |
|---|---|---|---|---|---|---|
| $T_{ist}$/°C. | 18 | 19 | 20 | 21 | 22 | 23 |
| 14 | 220 | 274 | 329 | 384 | 441 | 498 |
| 15 | 164 | 217 | 272 | 327 | 383 | 440 |
| 16 | 108 | 162 | 216 | 270 | 326 | 382 |
| 17 | 54 | 106 | 159 | 213 | 268 | 324 |
| 18 | 0 | 52 | 104 | 158 | 212 | 267 |
| 19 | 0 | 0 | 50 | 103 | 156 | 211 |

TABLE 1-continued

| | $T_{soll}$/°C. | | | | | |
|---|---|---|---|---|---|---|
| $T_{ist}$/°C. | 18 | 19 | 20 | 21 | 22 | 23 |
| 20 | 0 | 0 | 0 | 49 | 101 | 155 |
| 21 | 0 | 0 | 0 | 0 | 50 | 100 |
| 22 | 0 | 0 | 0 | 0 | 0 | 50 |
| 23 | 0 | 0 | 0 | 0 | 0 | 0 |

Example of a table for the power required in accordance with the first and second flow chart $P=f_2(A,Q)$(unit W)

TABLE 2

| | Q/W/M² | | | | | |
|---|---|---|---|---|---|---|
| A/M | 0 | 100 | 200 | 300 | 400 | 500 |
| 0.5 | 0 | 58 | 116 | 174 | 232 | 290 |
| 1.0 | 0 | 232 | 464 | 697 | 929 | 1161 |
| 1.5 | 0 | 522 | 1176 | 1568 | 2090 | 2613 |
| 2.0 | 0 | 929 | 1858 | 2787 | 3716 | 4644 |
| 2.5 | 0 | 1451 | 2903 | 4354 | 5806 | 7257 |
| 3.0 | 0 | 2090 | 4180 | 6270 | 8360 | >10000 |
| 3.5 | 0 | 2845 | 5689 | 8534 | >10000 | >10000 |
| 4.0 | 0 | 3716 | 7431 | >10000 | >10000 | >10000 |

We claim:

1. A method of providing a comfortable temperature in an area occupied by any person (15) in a room (12) of low temperature, by means of a radiator (18), comprising:
  a) continuously measuring the temperature of the surroundings of the radiator (18) outside of the field of radiation of the radiator (18),
  b) calculating a required irradiation of said area from said temperature by an electronic unit (21),
  c) measuring the distance(A) between said area and said radiator (18), and
  d) providing such power in the radiator (18) as is required by the calculated irradiation and the measured distance (A).

2. A method as claimed in claim 1 wherein the measurement of the temperature of said surroundings includes measurement of the air temperature caused by convection and the radiation temperature of the wall surfaces (13) bounding the room.

3. The method of claim 1 wherein in addition velocity of air in said room and/or the relative humidity of said air is measured and such power is provided in the radiator (18) as is required by the calculated irradiation, the measured distance (A) and the resultant measurement.

4. A method as claimed in claim 1, characterized in that the distance (A) between the area and the said at least one radiator (18) is either set by hand and fed to the electronic unit (21) as a constant value, or is automatically measured by a sensor (23).

5. An arrangement for providing a comfortable temperature in an area occupied by any person (15) in a room (12) of low temperature, said arrangement comprising:
  a) at least one radiator (18) arranged in the room (12) and aimed at said area,
  b) a measuring unit (16) for measuring the temperature of the surroundings of said at least one radiator(18) outside of the field of radiation of said at least one radiator(18),
  c) means for measuring distance between said area and said at least one radiator(18), and
  d) an electronic unit (21) for calculating the irradiation required of said area from said temperature, calculating power required for effecting said irradiation and, based, on said distance, for controlling power supplied to said at least one radiator (18) for effecting said required irradiation.

6. A arrangement as claimed in claim 5, characterized by a measuring unit (22) for measuring the distance (A) between the person (15) and the radiator (18) being positioned in the region of the radiator (18).

7. A arrangement as claimed in claim 5, characterized in that an ultrasonic measuring unit or an infrared measuring unit is provided as the measuring unit (22).

8. A arrangement as claimed in claim 5, characterized in that the radiator (18) is movably arranged and can be aimed at the person (15) and made to follow the person (15) via a movement detector (23).

9. A arrangement as claimed in claim 5, characterized by further measuring units (24, 25) arranged in the surroundings of the person (15) for registering the relative humidity and the air velocity.

10. The arrangement of claim 5 wherein the value of the irradiation required for achieving a desired comfortable temperature, dependent upon the ambient temperature of said at least one radiator (18) is stored in a first table in the electronic unit and the value of the power, dependent upon the required irradiation and the distance, is stored in a second table in the electronic unit.

* * * * *